UNITED STATES PATENT OFFICE.

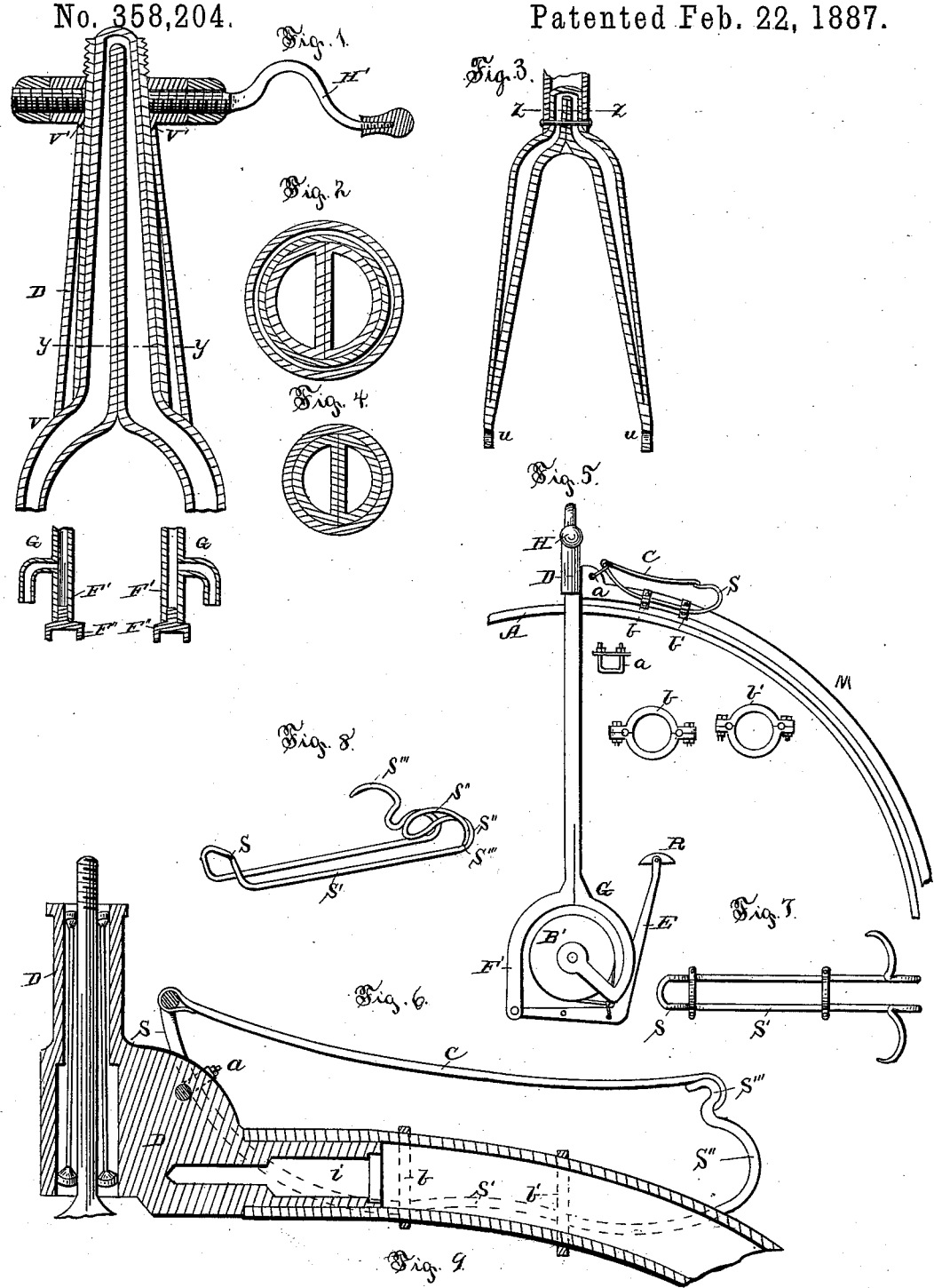

HOMER A. KING, OF SPRINGFIELD, MASSACHUSETTS, ASSIGNOR TO THE KING WHEEL COMPANY, OF NEW YORK, N. Y.

VELOCIPEDE.

SPECIFICATION forming part of Letters Patent No. 358,204, dated February 22, 1887.

Application filed August 5, 1886. Serial No. 210,107. (No model.)

*To all whom it may concern:*

Be it known that I, HOMER A. KING, a citizen of the United States, residing at Springfield, in the county of Hampden and State of Massachusetts, have invented new and useful Improvements in Velocipedes, which improvements are fully set forth in the following specification, the accompanying drawings making part of the specification.

My invention relates to improvements in bicycles, tricycles, and quadricycles; and it consists in an improved steering-head with the fork formed by uniting tubes.

Heretofore the steering-heads of velocipedes have been forged with a solid arch and sides of the fork solid either all the way down or brazed into tubes, which are heavy. My invention renders them lighter and stronger when of the same weight.

My invention further consists in an improved rear fork, the two sides formed of tubing riveted and brazed together in the lower end of the perch, which is stronger than when made by splitting a tube or forming each side of sheet metal, and lighter than when made solid.

My invention further consists in an improved spring-frame for a velocipede-saddle made of one piece of steel wire or rod bent as shown to receive the leather.

Referring to the drawings, similar letters of reference indicate corresponding parts.

Figure 1 shows the upper part of the fork of the large front wheel of a bicycle, constructed of tubes flattened and inclosed in an outer piece of tubing, where it is pinned and brazed to form the steering-head of the fork of the large front steering-wheel. It may be constructed with inclined surfaces on the outside at $v$, upon which the perch connection or neck D may fit. The neck D also has a beveled surface at its upper end at $v'$, into which a beveled projection from the base of the handle-bar fits. Fig. 1 also shows the fulcrums F'' F'' inserted in the end of the sides of the fork, and also the axle-supports G G inserted in forks F; but I prefer to have G G and F' F' flattened like the head of the rear fork, Fig. 4, and inserted in F, as shown in Fig. 5. The center of the steering-head and the forks may be made of one piece of tubing.

Fig. 2 is a cross-section of Fig. 1, taken in line $y\ y$, and shows the space between the outer perch-neck, D, and the tube encircling the united sides of the fork.

Fig. 3 is a sectional view of the fork for the small wheel of a velocipede, and is shown formed of tubing inserted (between Z Z) in the end of the perch, which is shown broken off just above where the fork is riveted to hold it in place while it is brazed into the perch. The rear fork may be made of one or of two pieces of tubing formed into the shape shown. It may be inserted directly into the lower end of the perch, as shown, or brazed into a short tube and this slipped over the lower end of the backbone and brazed or used as the fork of the small steering-wheel of a bicycle or tricycle, and used before or in the rear of a large wheel.

Fig. 4 is a cross-section of the two sides of the fork where united in the perch between Z Z, Fig. 3.

Fig. 5 is part of a side elevation view of a bicycle to show retracing-drum B', the fulcrum F', and axle-support G, flattened, as shown in cross-section in Fig. 4, and inserted and brazed in fork F. It also shows the lever E with treadle R, rim and tire A, perch M, the handle-base H, and perch-connection D, with hole at $a$ for saddle spring-clip, saddle-spring S, with clips $b$ and $b'$, and leather seat C, (but only one of the clips $b$ or $b'$ may be used,) and the rests for the spring-rod being above or below the center, moving the clip back or forward raises or depresses the rear end of the saddle.

Fig. 6 is a sectional side elevation view of part of Fig. 5, taken in line D M, and shows the hollow $i$ to lighten the neck D, my inclined anti-friction spool-bearings, and also shows one-half of the spring saddle-frame bent up in front at S, running side of the perch at S' bent at S'' for elasticity, and bent at S''', so that the leather C shall turn over this portion of the spring.

Fig. 7 is a top or plan view of the spring saddle-frame made of one piece of suitable-sized steel wire or rod. The parts S' may run parallel or nearly parallel at the sides of or above the perch M, and the rear end may be adjusted by moving the clips $b$ or $b'$.

Fig. 8 is a view in perspective of the spring-saddle-frame, showing more accurately the rear pitch of the elevated front to hold the front end of the leather seat C.

Fig. 9 is a top or plan view of the completed saddle, the dots showing the course of the steel rods. A spring may be arranged, essentially as in a former application of mine, to automatically bring the sides of the saddle nearer together when relieved of the rider's weight, and the weight of the rider to spread them apart; or they may be secured at any desired distance apart by lacing extending from a lower lining-strip of one part of the seat C to a strip on the under side of the other part of seat C, or the seat closed at each end. The tension of the seat may be regulated by adjusting the clips.

Having thus described my invention, what I claim as new, and desire to secure by Letters Patent, is—

1. A bicycle-fork and steering-head for the front steering-wheel, both composed of tubing constructed essentially as described, the two arms of the fork alone forming the arch of the fork over the wheel, each arm of the fork where united forming in cross-section one-half a circle, and the two forming the center circular steering-head, which tapers upwardly, and these are permanently united by being inclosed in a tube, and all three brazed together.

2. The steering-head formed with the sides of the fork with tubing and the base of the handle-bar constructed so that the handle-bars screw in against the steering-head, as shown.

3. The hollow fork of a small wheel of a velocipede formed not of sheet metal, but of tubing, each prong of the fork formed of tubing shaped as set forth, with a lug at the lower end for the wheel-pin or bearing and shaped near the upper end so that the two sides form the arch, and the two complementary sides shaped to form together, above the arch, a substantially cylindrical shoulder and tenon for the jointure with the perch or frame where it is inserted, pinned, and brazed, substantially as set forth.

4. The steel spring saddle-frame made of one piece of metal bent, essentially, as shown, with a horizontal part of the rod just back of the steering-head at right angles with the backbone and bent downward on each side of the backbone to form the spring-frame of the saddle without the usual rear saddle-plate, the rods bending upward and forward, then upward, backward, and upward, when each end of the rod forming the saddle-springs under the rear of the seat is bent outward nearly at right angles to the backbone and nearly in a horizontal position, the ends being gradually bent inward, and near each end inward and downward, and the seat suspended from the front horizontal part of the saddle-frame to the rear horizontal part, substantially as set forth, a clip holding the front end of the frame to the neck of the backbone, and one or more clips holding the frame in proper position at each side of the backbone.

HOMER A. KING.

Witnesses:
BENJ. FAGVAUT,
ALLEN WEBSTER.